United States Patent [19]

Finger

[11] Patent Number: 4,618,304

[45] Date of Patent: Oct. 21, 1986

[54] SILO HOPPER FOR SILAGE UNLOADERS

[76] Inventor: Edward M. Finger, Rte. 1, Powhattan, Kans. 66527

[21] Appl. No.: 687,967

[22] Filed: Dec. 31, 1984

[51] Int. Cl.[4] ............................................. B65G 65/42
[52] U.S. Cl. .................................... 414/306; 198/533; 222/242; 414/327
[58] Field of Search ............... 414/304, 305, 306, 307, 414/308, 309, 310, 311, 312, 325, 327; 222/227, 228, 239, 242; 198/533

[56] References Cited

U.S. PATENT DOCUMENTS

| | | | |
|---|---|---|---|
| 1,275,558 | 8/1918 | Holmgreen | 414/306 X |
| 3,057,522 | 10/1962 | Reed | 222/285 |
| 3,064,831 | 11/1962 | Cook | 414/306 X |
| 3,067,914 | 12/1962 | Ellaby | 414/311 X |
| 3,487,960 | 1/1970 | Evers | 414/292 |
| 3,499,556 | 3/1970 | Broberg | 414/307 |
| 3,519,152 | 7/1970 | Broberg | 414/306 |
| 3,557,979 | 1/1971 | Zortman | 414/287 |
| 3,581,916 | 6/1971 | Brumaqim | 414/310 X |
| 3,613,912 | 10/1971 | Dissmeyer et al. | 414/308 |
| 3,650,417 | 3/1972 | Dissmeyer et al. | 414/308 |
| 3,650,418 | 3/1972 | Dissmeyer et al. | 414/308 |
| 3,800,964 | 4/1974 | Patterson | 414/310 |
| 4,146,145 | 3/1979 | Easton | 414/312 |
| 4,167,248 | 9/1979 | Akazawa et al. | 222/227 X |
| 4,286,909 | 9/1981 | Tingskog | 414/144 |
| 4,313,706 | 2/1982 | Danford | 414/326 |
| 4,386,695 | 6/1983 | Olson | 198/661 |
| 4,426,187 | 1/1984 | Olson | 414/310 |
| 4,436,473 | 3/1984 | Olson | 414/310 |
| 4,437,806 | 3/1984 | Olson | 414/307 |

Primary Examiner—Robert J. Spar
Assistant Examiner—Ken Muncy
Attorney, Agent, or Firm—Schmidt, Johnson, Hovey & Williams

[57] ABSTRACT

An upright silo has a U-shaped central discharge opening in the floor and a cavity below the floor in vertical alignment with the opening. A hopper in the cavity has an upright wall terminating at an upper edge and a smooth, inclined slip ramp contiguous with the edge and rigidly secured to the floor along the opening. The horizontal configurations of the opening, the cavity, the wall and the ramp are identical. The silage falls freely from a cutter arm above the floor into the hopper such that unloading time is substantially decreased. In one embodiment, a rake is movable within the cavity adjacent the ramp and is operable to break up otherwise lodged silage. In another embodiment, a somewhat similar rake has an outer segment which is pivotal about a vertical axis for retraction when not in use.

8 Claims, 7 Drawing Figures

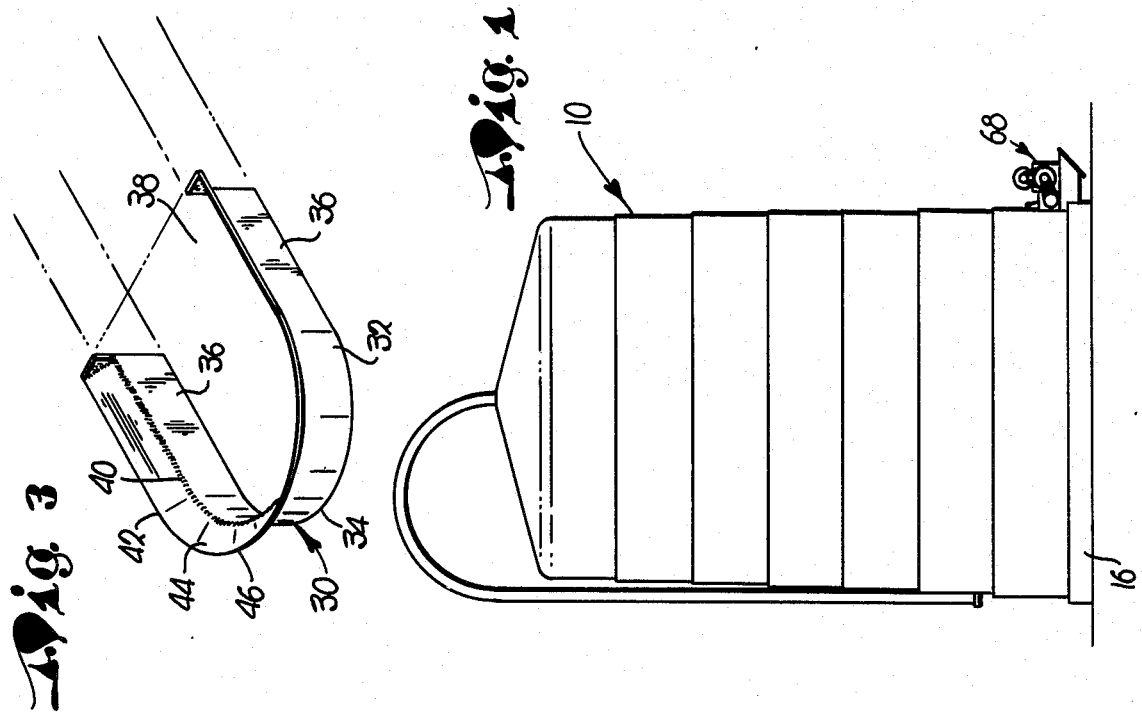
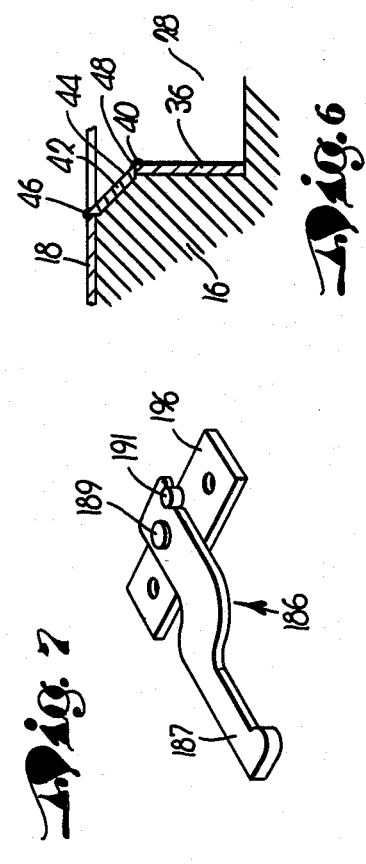
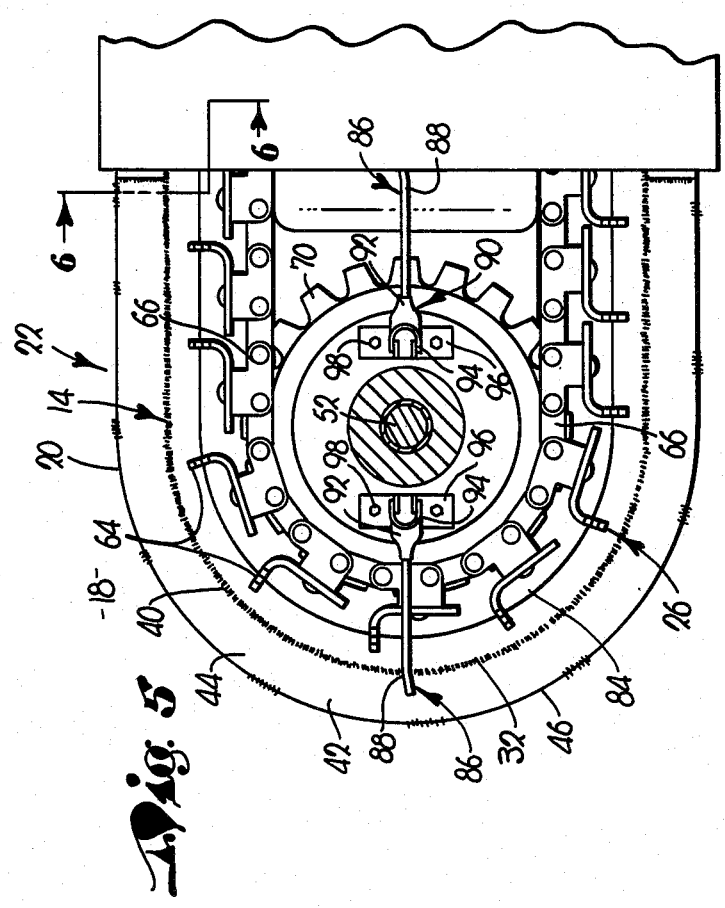

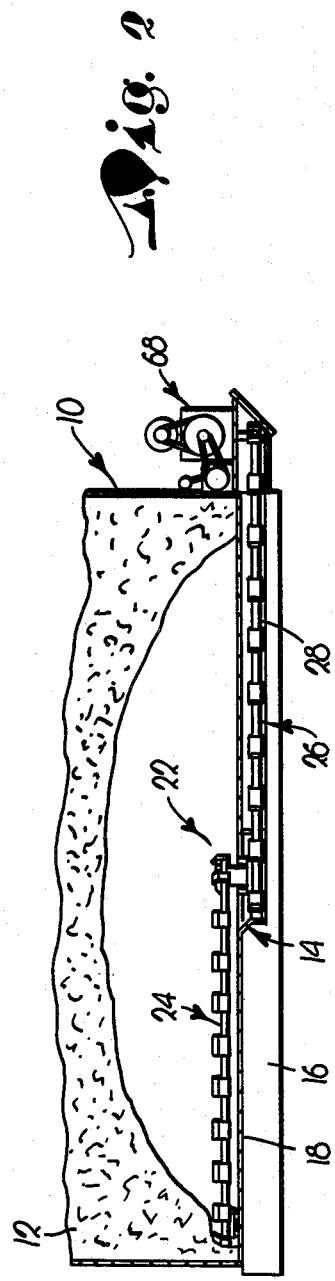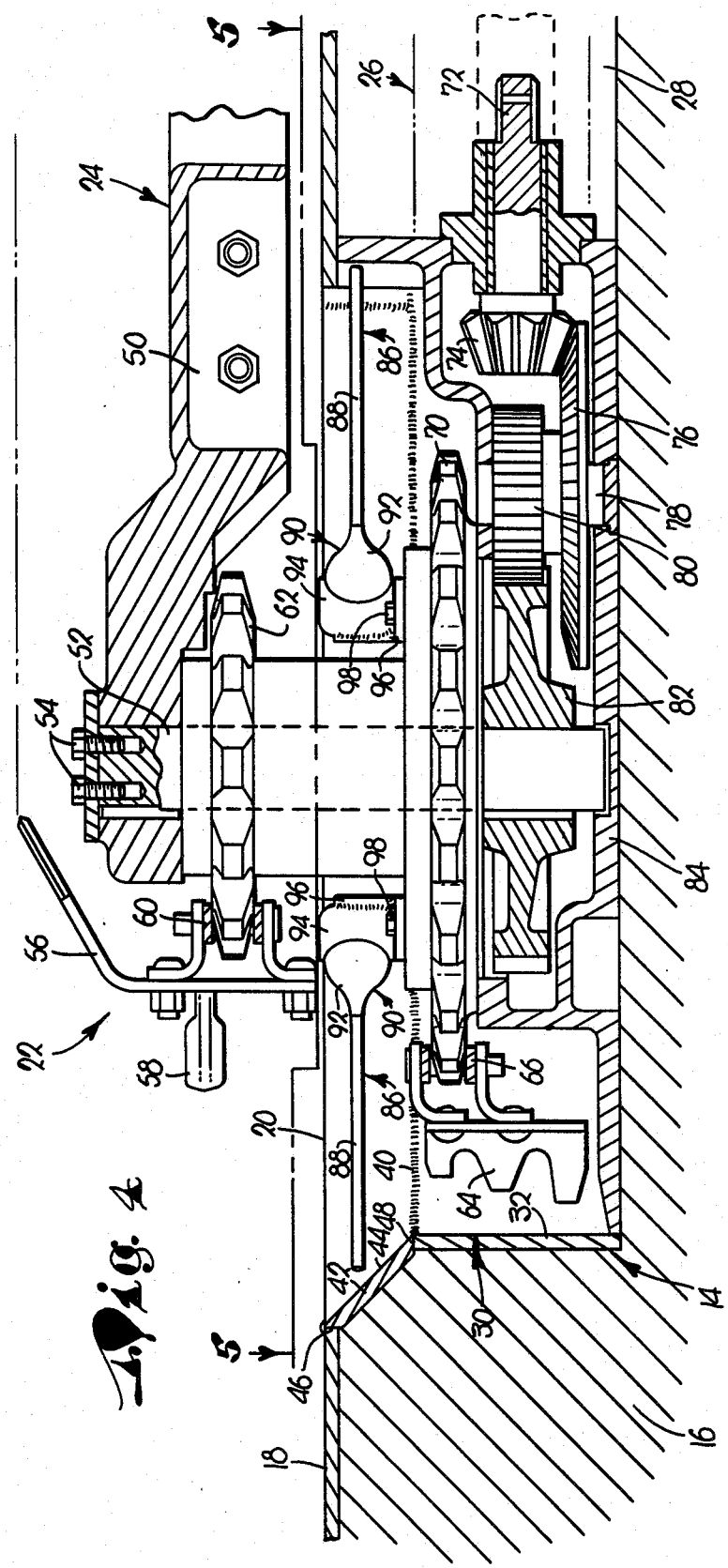

SILO HOPPER FOR SILAGE UNLOADERS

BACKGROUND OF THE INVENTION

1. Field of the Invention

This invention relates to an improved silo hopper for silage unloaders wherein the hopper includes in combination a U-shaped upright lower wall and an inclined slip ramp interposed between the wall and the floor of the silo. A rake in the slip ramp displaces lodged clumps of silage for descent into the wall of the hopper.

2. Description of the Prior Art

My present invention relates to improvements in bottom unloaders for silage within a silo, of the kind disclosed, for example, in the U.S. Pat. No. 3,650,418, issued Mar. 21, 1972. Such unloaders have a cutter arm mechanism journaled for horizontal rotation above the floor of the silo and the arm carries a plurality of cutting and conveying blades mounted on an endless chain. The blades dislodge the silage and transport the latter inwardly to a central discharge opening in the floor. A trough extends radially to the exterior of the silo and a conveyor is operable within the trough to transfer the silage along a path beneath the floor to the exterior of the silo.

However, as the cutter arm transports the silage, only about one-half of the silage gravitates into the opening. The remaining portions of the silage tend to cling to the cutting and conveying blades and return along the floor toward the outer end of the cutter arm. Such inefficiency results in a wasteful duplication of time and consumed power as well as needless silage degradation as the latter is endlessly recirculated by the cutter arm.

SUMMARY OF THE INVENTION

The improvement of the present invention overcome the disadvantages outlined above by the provision of a novel hopper which efficiently receives the silage transported by the cutter arm such that a minimum amount of dislodged silage is recirculated by the cutter arm.

The hopper, disposed in a central cavity has a U-shaped, upright, lower wall provided with an upper edge disposed at a lower elevation than the floor. Additionally, and of extreme importance, a U-shaped slip ramp is interposed between the wall and the floor in direct communication with the opening and the confines of the wall. The ramp has a smooth inner surface which slopes downwardly and inwardly from the floor to the upper edge of the wall at an angle above the angle of repose for the silage.

To still further improve the operation of the ramp, a rake is rotatable within the slip ramp. The rake is connected to a sprocket wheel around which the inner end of the conveyor chain is trained, such that the rake moves in a horizontal path to displace any silage that is temporarily stuck or lodged in ramp and adjacent the floor.

Consequently, approximately three-fourths or more of the silage transported inwardly by the cutter arm will fall from the latter into the hopper for ultimate engagement with the conveyor. Obviously, such a fifty percent increase in efficiency over prior art construction reduces the amount of redundant work normally expended by the cutter arm such that power requirements, wear on the cutting mechanism, and unloading time are all substantially decreased.

BRIEF DESCRIPTION OF THE DRAWINGS

FIG. 1 is a side elevational view of an upright silo showing an external power unit for a bottom unloader;

FIG. 2 is an enlarged, fragmentary, side elevational view, partially in section, of a portion of the unloader;

FIG. 3 is a perspective view of the hopper;

FIG. 4 is an enlarged, fragmentary, cross-sectional view of the silo showing the cutter arm, the silage-receiving hopper, the rake and a portion of the conveyor;

FIG. 5 is a cross-sectional view on a reduced scale taken along line 5—5 of FIG. 4;

FIG. 6 is a detailed, cross-sectional view taken along line 6—6 of FIG. 5; and

FIG. 7 is an enlarged, perspective view of an alternate form of rake.

DETAILED DESCRIPTION OF THE DRAWINGS

FIG. 1 illustrates an upright, cylindrical silo 10 for storing silage 12 (FIG. 2), having a U-shaped cavity 14 in a concrete bottom 16 thereof, and a floor 18 disposed at a higher elevation than the cavity 14, the floor 18 being provided with a U-shaped central discharge opening 20 vertically aligned with the cavity 14.

The silo 10 has a silage unloader, broadly designated 22, including mechanism in the nature of a cutter arm 24 above the floor 18 for dislodging the silage 12 and funnelling the same gravitationally into the opening 20, and a conveyor 26 for lateral feeding of the dislodged silage 12 to the exterior of the silo 10 along a path which partially includes a trough 28 extending radially outwardly from the cavity 14.

A hopper 30 is disposed in the cavity 14 for receiving the dislodged silage 12 from the arm 24. The hopper 30 includes a U-shaped, upright wall 32 having a bight 34 and a pair of elongated, horizontally spaced legs 36. A discharge port 38 is disposed in opposed relation to the bight 34 for the flow of dislodged silage 12 therethrough in response to operation of the conveyor 26. The wall 32 has a horizontal upper edge 40 extending along the legs 36 and the bight 34 thereof, the edge 40 being disposed at a lower elevation than the floor 18.

Additionally, the hopper 30 includes a U-shaped slip ramp 42 interposed between the wall 32 and the floor 18 in direct communication with the opening 20 and the confines of the wall 32. The ramp 42 has a smooth, flat, inner surface 44 and slopes downwardly and inwardly from the floor 18 to the edge 40 at an angle along which the silage 12 will freely slide downwardly and inwardly from the opening 20 into the confines of the wall 32 without any appreciable repose on the surface 44.

The configurations of the opening 20, the cavity 14, the wall 32 and the ramp 42 are identical. Furthermore, the ramp 42 has an upper margin 46 provided with the same dimensions as the opening 20, the margin 46 being contiguous with the opening 20 and rigidly secured to the floor 18. Additionally, the ramp 42 has a lower margin 48 provided with the same dimensions as the wall 32, the margin 48 being contiguous with the edge 40 and rigidly secured to the wall 32.

The arm 24 includes a radially extending support 50 which is attached to an upper end of a rotatable upright post 52 by means of a pair of bolts 54. The arm 24 also includes a plurality of partially inclined cutting and conveying blades 56, each of which supports an outwardly extending ear 58 and each of which is carried by an endless chain 60. At the outer end of the arm 24, the chain 60 is trained about a sprocket wheel (not shown) coupled to the support 50, and at the inner end the chain 60 is driven and supported by a sprocket wheel 62. The wheel 62 is journaled by suitable bearings for rotation around the post 52.

The conveyor 26 includes a plurality of paddles 64 mounted on an endless roller chain 66 that is driven at its outer end by a suitable sprocket wheel (not shown) operably connected to a power unit 68 (FIG. 1). At its inner end, the chain 66 is trained around a sprocket wheel 70 that fixedly engages the wheel 62. The wheel 70 is also journaled for rotation about the post 52.

The unit 68 is also operable to horizontally rotate the support 50 above the floor 18. The unit 68 is coupled to a shaft 72 which fixedly engages a bevel gear 74. The gear 74 meshingly engages a second bevel gear 76 which is journaled for rotation about an upright pin 78, and the gear 76 is secured to a rotatable spur gear 80. In turn, the gear 80 meshingly drives a gear 82 securely mounted on the post 52 for ultimate horizontal rotation of the support 50.

The shaft 72 and the gears 74, 76, 80 and 82 are generally contained for protection within a housing 84 which extends from the cavity 14 radially outward through the trough 28. Additionally, the post 52 and the pin 78 are supported by the housing 84 for horizontal rotation.

As seen in FIGS. 4 and 5, a rake 86 is movable within the ramp 42 and is operable to agitate and displace a portion of the silage 12 in the ramp 42 and adjacent the floor 18. The rake 86 includes a elongated, pair of diametrically opposed, horizontal rods 88 each of which has a slight angular configuration at its outer end. Each rod 88 is connected at its inner end to a resilient mount 90. The mount comprises a rubber member 92 that is attached to a U-shaped clip 94 which, in turn, is fixed to a bracket 96. A pair of bolts 98 connect the bracket 96 to the upper, horizontal surface of the wheel 70.

In the embodiment shown in FIG. 7, a rake 186 includes a pair of segments 187 mounted for pivotal movement about a vertical axis by means of an upright pin 189 which is secured to a bracket 196 mounted on the wheel 70. A stop 191 extends upwardly from the bracket 196 for engagement with the segment 187 when the latter reaches one end of its pivotal path of travel. In similar fashion to the rake 86, the segments 187 are rotatable within the ramp 42 to agitate, break up and displace a portion of the silage 12.

OPERATION

In use, the blades 56 of the arm 24 are operable to dislodge a portion of the silage 12 that is typically contained above a bridge or arch formed within the silo 10, as illustrated in FIG. 2. The blades 56 transport the silage 12 inwardly to the port 38 near the inner end of the arm 24, whereupon a large portion of the silage 12 descends by gravity into the hopper 30.

I have observed that by inclining the ramp 42 at approximately a forty-five degree angle from horizontal, typically three-fourths of the silage 12 transported inwardly by the cutter arm 24 will fall into the hopper 30. Obviously, the angle need not be exactly forty-five degrees and other angularities may possibly also provide good or better results.

The combination of the ramp 42 and the wall 32 cooperate in such a fashion that output from the unloader 22 is increased by fifty percent or greater. Direct observation is obviously impractical and thus the exact theory underlying the improved results of my invention is unknown. Noteworthy is the fact that a simple enlargment of a conventional silo hopper would not, by contrast, give similar results and also could weaken the floor to the point of failure.

The rake 86, being coupled to the conveyor wheel 70, rotates along a horizontal path within the ramp 42 to agitate any of the silage 12 that is stuck or otherwise detained during its gravitational descent. The mount 90 is yieldable for reducing breakage of the rake 86 whenever an immobile obstacle is encountered or a relatively hard item such as a rock is lodged between the rod 88 and the ramp 42.

In the embodiment shown in FIG. 7, the rake 186 is operable in similar fashion to the rake 86 whenever the wheel 70 is moving counterclockwise, viewing FIG. 5. However, when the conveyor 26 is reversed, the outer segment 187 swings and retracts inwardly to a position closely adjacent the wheel 70. Reverse movement of the conveyor 26 is advantageous whenever the silage 12 falls into the hopper 30 without the use of the arm 24. Consequently, in such operation, the rake 186 will pivot inwardly and thus avoid substantial engagement with the fallen silage 12 to preclude unnecessary chopping, disintegration or other interaction with the crop. As such, the rake 186 is operable to lower the overall energy requirements of the unit 68.

I claim:

1. In an upright, cylindrical silo for storing silage, having a U-shaped silage-receiving cavity in the bottom thereof, a floor at a higher elevation than the cavity and provided with a U-shaped opening vertically aligned with the cavity, a silage unloader including mechanism above the floor for dislodging the silage and funneling the same gravitationally into the opening, and a conveyor for lateral feeding of the dislodged silage to the exterior of the silo, said mechanism having rotatable silage-dislodging means situated above said opening, said silage-conveying means including rotatable paddle means located within said cavity below said opening, and means including upright shaft means presenting a rotational axis for selective, alternate movement in both the clockwise and counterclockwise directions of said silage-dislodging means and said paddle means, the improvement of which comprises:

a hopper in the cavity for receiving the dislodged silage from said mechanism, said hopper including:
- a U-shaped, upright wall having a bight, a pair of elongated, horizontally-spaced legs and a discharge port in opposed relation to the bight for flow of dislodged silage therethrough in response to operation of said conveyor,
- said wall having an upper edge extending along the legs and the bight thereof and being disposed at a lower elevation than the floor, and
- a U-shaped, slip ramp interposed between the wall and the floor in direct communication with the opening and the confines of said wall,
- said ramp having a smooth, flat, inner surface and sloping downwardly and inwardly from said floor to said edge at an angle along which the silage will freely slide downwardly and inwardly from the opening into said confines of the wall without any appreciable repose on said surface; and a rotatable rake assembly, including:
- an elongated rake having an inner end and an outer end and located in the region between said silage-dislodging means and said paddle means;

means operatively and pivotally coupling the inner end of said rake to said shaft means for rotation of the rake assembly in both of said directions with said silage-dislodging means and said paddle means, and for pivoting movement of the rake about an upright axis independently of said rotation of the rake assembly with the silage-dislodging means and the paddle means; and stop structure associated with said rake for engaging and holding the same in an operating position extending outwardly from said shaft means when said moving means is operated to rotate the rake assembly in one of said directions, and for permitting the rake to pivot to a retracted position adjacent said shaft means when said moving means is operated to rotate the rake assembly in the other of said directions.

2. The invention of claim 1, the configurations of the opening, the cavity, the wall and the ramp being similar for a mating fit therebetween.

3. The invention of claim 2, said ramp having an upper margin Having dimensions similar to the dimensions as said opening for a mating fit therebetween.

4. The invention of claim 3, said ramp having its upper margin contiguous with the opening and rigidly secured to the floor.

5. The invention of claim 4, said ramp having a lower margin provided with the same dimensions as said wall.

6. The invention of claim 5, said ramp having its lower margin contiguous with said edge and ridigly secured to said wall.

7. In an upright, cylindrical silo for storing silage, having a U-shaped silage-receiving cavity in the bottom thereof, a floor at a higher elevation than the cavity and provided with a U-shaped opening vertically aligned with the cavity, a silage unloader including mechanism above the floor for dislodging the silage and funneling the same gravitationally into the opening, and a conveyor for lateral feeding of the dislodged silage to the exterior of the silo, said mechanism having rotatable silage-dislodging means situated above said opening, said silage-conveying means including rotatable paddle means located within said cavity below said opening, and means including upright shaft means presenting a rotational axis for selective, alternate movement in both the clockwise and counterclockwise directions of said silage-dislodging means and said paddle means, the improvement of which comprises:

a hopper in the cavity for receiving the dislodged silage from said mechanism; and a rotatable rake assembly, including:

an elongated rake having an inner end and an outer end and located in the region between said silage-dislodging means and said paddle means;

means operatively and pivotally coupling the inner end of said rake to said shaft means for rotation of the rake assembly in both of said directions with said silage-disloding means and said paddle means, and for pivoting movement of the rake about an upright axis independently of said rotation of the rake assembly with the silage-dislodging means and the paddle means; and stop structure associated with said rake for engaging and holding the same in an operating position extending outwardly from said shaft means when said moving means is operated to rotate the rake assembly in one of said directions, and for permitting the rake to pivot to a retracted position adjacent said shaft means when said moving means is operated to rotate the rake assembly in the other of said directions.

8. In an upright silo for storing silage having a silage-receiving cavity in the bottom thereof, a floor at a higher elevation than the cavity and provided with an opening aligned with the cavity, a silage unloader including mechanism above the floor for dislodging the silage and funneling the same gravitationally into the opening, and a conveyor for lateral feeding of the dislodged silage to the exterior of the silo, the improvement comprising:

a hopper in the cavity for receiving the dislodged silage from said mechanism; and a rotatable rake assembly including:

an elongated rake having an inner end and an outer end and located adjacent said opening;

means adjacent the inner end of said rake for mounting the rake for selective, alternate rotational movement thereof in both the clockwise and counterclockwise directions, and for pivoting movement of the rake about an upright axis independently of said rotation thereof; and stop structure associated with said rake for engaging and holding the same in an operating position extending outwardly from said mounting means to a point proximal to said hopper when said rake is rotated in one of said directions, and for permitting the rake to pivot to a retracted position adjacent said mounting means when the rake is rotated in the other of said directions.

* * * * *